(12) United States Patent
Howell et al.

(10) Patent No.: US 7,340,834 B1
(45) Date of Patent: Mar. 11, 2008

(54) METHOD OF LUBRICATING BEARINGS

(75) Inventors: Jon L. Howell, Bear, DE (US); Gregory Alan Bell, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/902,333

(22) Filed: Jul. 29, 2004

Related U.S. Application Data

(60) Provisional application No. 60/491,117, filed on Jul. 30, 2003.

(51) Int. Cl.
 *B21D 53/10* (2006.01)
 *F16C 32/06* (2006.01)

(52) U.S. Cl. .............. 29/898.02; 29/898.1; 29/898.12; 184/5; 384/100

(58) Field of Classification Search .............. 29/898.1, 29/898.12, 898.02; 184/5; 384/907, 606, 384/462, 322, 13, 100; 508/100
See application file for complete search history.

(56) References Cited

U.S. PATENT DOCUMENTS

| | | | | |
|---|---|---|---|---|
| 3,801,505 | A | * | 4/1974 | Hong .......................... 508/155 |
| 4,675,452 | A | * | 6/1987 | Lagow et al. ............... 568/601 |
| 5,593,230 | A | | 1/1997 | Tempest et al. |
| 5,636,708 | A | * | 6/1997 | Wedeven et al. .......... 184/6.22 |
| 5,954,894 | A | * | 9/1999 | Tsushima .................... 148/319 |
| 6,024,493 | A | | 2/2000 | Tempest et al. |
| 6,541,430 | B1 | * | 4/2003 | Beatty ......................... 508/368 |
| 6,722,135 | B2 | | 4/2004 | Davis et al. |

FOREIGN PATENT DOCUMENTS

JP 54021409 A * 2/1979

OTHER PUBLICATIONS

Dimofte, Florin; Proctor, Margaret P.; Keith, Theo G., Wave Fluid Film Bearing Tests for an Aviation Gearbox, Jan. 2000, NASA/TM-2000-209766.*

Florin Dimofte, Wave Journal Bearing with Compressible Lubricant—Part 1: The Wave Bearing Concept and a Comparison to the Plain Circular Bearing, Presented at the 40th Annual Meeting in Calgary, Alberta, Canada, May 17-20, 1993; Final manuscript approved Jan. 6, 1994; vol. 38(1995), I, 153-160 Tribology Transactions.

NASTEC, INC., Wave Bearings; http://www.nastecinc.com/wavebearing.htm; 2001.

Abstract—Optimization of a Hybrid Gas Wave Bearing for Oil-free Turbomachinery, S. Cioc, T.G. Keith, Jr. and C. GAC University of Toledo, Toledo, OH and F. Dimofte and D.P. Fleming, NASA GAC, Cleveland, OH; Society of Tribologists, Stle 2003 New York program, Apr. 28-May 1, 2003, New York Hilton.

Florin Dimofte, et al., Wave Fluid Film Bearing Tests for an Aviation Gearbox, NASA/TM 2000-209766; Cover Page; pp. 1-7 plus Report Documentation Page; Jan. 2000; Prepared for 8th International Symposium on Transport Phenomena and Dynamics of Rotating Machinery sponsored by Pacific Center for Thermal Fluids Engineering, Honolulu, Hawaii, Mar. 26-30, 2000.

Jim Liang et al., *A study of boundary lubrication thin films produced from a perfluoropolyalkylether fluid onM-50 surfaces*, Tribology Letters 3 (1997) 107-112, J.C. Baltzer AG, Science Publishers, USA.

H.K. Trivedi et al., *Effect of temperature on tribological performance of a silicon nitride ball material with a linear perfluoropolyalkylether*, Tribology Letters vol. 10, No. 3, 2001, Plenum Publishing Corporation, USA.

GLOBALSPEC The Engineering Search Engine, Canyon Engineering Products, Inc.—Product Announcements: Website: http://www.globalspec.com/Supplier/Product_Announcements/CanyonEngineering: downloaded Sep. 7, 2007.

AeroShell Turbine Oil 500 from Aircraft Spruce, Aircraft Spruce & Specialty Co., Worldwide Distributor of Aircraft Parts and Pilot Supplies; *AeroShell Turbine Oil 500*; Website: http://www.aircraftspruce.com/catalog/eppages/shell500.php; downloaded Sep. 7, 2007.

Synlubestechnology: EMERY® Synthetic Turbine Lubricants; Technical Data Sheet #248G—Jul. 2000; Website: www.cognis-us.com.

* cited by examiner

*Primary Examiner*—David P. Bryant
*Assistant Examiner*—Sarang Afzali

(57) ABSTRACT

A method of lubricating a wave bearing comprising application of an oil comprising a perfluoropolyether, derivatized perfluoropolyether, fluorosilicone, polychlorotrifluoroether, or polyphenyl ether, wherein the oil is capable of sustaining temperatures greater than 121° C., and at an operating speed of up to 1.4 million DN without decomposition.

16 Claims, No Drawings

METHOD OF LUBRICATING BEARINGS

FIELD OF THE INVENTION

The present invention relates to a method for lubricating bearings.

BACKGROUND OF THE INVENTION

High speed, high performance machines need stable, low friction bearings in order to operate smoothly and efficiently. The electronics industry has provided numerous new developments for high speed bearings, used, for example, in hard disc drives, laser printers and other electronic equipment where speeds in excess of 10,000 rpm are needed. These bearings typically use a gas, specifically air, as a lubricant.

Such bearings as described in the prior art have not been shown to perform in applications where high temperatures in addition to high speed may be encountered. In particular, gas turbine engine manufacturers are seeking engine main shaft bearings capable of operating up to temperatures of 700° F. and 4 million DN, where DN is the speed parameter, the product of bearing bore diameter in mm and shaft rotative speed in rpm (revolutions per minute). Such operating conditions are beyond the capability of conventional ball and roller bearings.

Conventional circular bearings are disadvantaged in high performance applications due to tendencies to promote shaft instabilities at high speeds, low load conditions. More recently, non-circular types of bearings have been developed which provide good shaft stability. In particular, the wave bearing disclosed in U.S. Pat. No. 5,593,230, in which a waved profile is circumscribed on the inner bearing diameter with a wave amplitude equal to a fraction of the bearing clearance, has been designed and validated for use in general aviation gas turbines. However, theoretical studies have indicated concerns with wave bearings under blade out conditions and after oil interruption, where wave bearings are believed to have poor tolerance.

Wave bearings are disclosed and have been described, for example, in Dimofte, F. "Wave Journal Bearing with Compressible Lubricant—Part I: The Wave Bearing Concept and a Comparison to the Plain Circular Bearing," STLE Tribology Transactions, Vol. 38(1), pp. 153-160 (1995). The use of wave bearings with oil lubricants at conventional temperatures is described in Dimofte, F.; Proctor, M. P.; Fleming, D. P.; Keith, T. G., Jr. "Wave Fluid Film Bearing Tests for an Aviation Gearbox," Technical Memorandum, NASA TM-2000-209766, January, 2000. However, theoretical (analytical) studies investigating use of wave bearings under conditions of high temperature and high speed indicated problems are found in experimental studies at an oil temperature of 120° C.

Therefore, there remains a need for a method of lubricating bearings at higher temperatures and higher speeds, with reliable performance. The present invention meets this need.

SUMMARY OF THE INVENTION

The present invention comprises a method of lubricating a wave bearing comprising introducing oil to said bearing to produce a lubricated bearing, which oil sustains a temperature higher than 121° C. without decomposition.

The present invention further comprises a method of a lubricating a wave bearing in a machine comprising (a) providing a wave bearing, (b) providing an oil which lubricates said bearing to produce a lubricated bearing, and (c) operating said machine at a temperature greater than about 121° C., wherein said oil sustains said temperature without decomposition.

DETAILED DESCRIPTION OF THE INVENTION

The present invention comprises a method for lubricating a wave bearing structure, and a method of using the lubricated bearing structure in a machine. In particular, the present invention provides a method of lubricating a wave bearing comprising introducing an oil to the bearing to produce a lubricated bearing and operating the lubricated bearing at a temperature greater than about 121° C. The oil sustains or withstands the temperatures greater than about 121° C. without decomposition. The present invention further provides a method of using a lubricated bearing in a machine comprising (a) providing a wave bearing in the machine, (b) providing an oil which lubricates said bearing to produce a lubricated bearing, and (c) operating said machine such that the lubricated bearing is exposed to conditions of temperature greater than about 121° C. wherein the oil sustains or withstands the temperature without decomposition.

By operating a wave bearing under the method of this invention, the thermal efficiency of a turbine engine can be increased more than 5% in the hottest engine area. Furthermore, a wave bearing can be operated under this invention at temperatures that have never before been known to be reached by a conventionally lubricated roller element bearing. The method of this invention is useful in a variety of applications and machines, and is particularly useful in applications, such as engines and turbines, where high temperatures are encountered.

The present invention comprises a method of lubricating a wave bearing comprising application of an oil, which oil can sustain temperatures greater than 121° C. A lubricating oil is supplied to the bearing structure. The oil is thermally and oxidatively stable at a temperature range above about 121° C., preferably above about 149° C., more preferably up to about 204° C., more preferably up to about 250° C., more preferably up to about 288° C., and more preferably up to about 399° C. Lubricating oils for use in the present invention are preferably selected from the group consisting of thermally and oxidatively stable esters, polyphenyl ethers (for example, those sold by Monsanto Company, St. Louis, Mo., including MCS 293), poly α-olefins, polyalkylene glycols, silicones, fluoro-silicones, polychlorotrifluoroethers, perfluoropolyethers (for example, those sold by E. I. du Pont de Nemours and Company, Wilmington, Del. under the trademark, "KRYTOX"), derivatized perfluoropolyethers, such as fluoroether triazines and mixtures of two or more of these. Preferred lubricating oils are selected from the group consisting of perfluoropolyethers, derivatized perfluoropolyethers, fluorosilicones, polychlorotrifluoroethers, and polyphenyl ethers. Perfluoropolyethers (hereinafter PFPE) are particularly suitable and are preferred for use in high temperature machines, such as turbine engines. Most preferred perfluoropolyethers are those sold by E. I. du Pont de Nemours and Company under the tradename "KRYTOX". These materials are produced by anionic polymerization of hexafluoropropylene epoxide as described by Moore in U.S. Pat. No. 3,332,826, herein incorporated by reference. The resulting poly(hexafluoropropylene oxide) PFPE fluids are described as poly(HFPO) fluids. In particular, KRYTOX 143 AD and KRYTOX XHT-500 are especially suitable, due to their capability to perform at higher temperatures, with KRYTOX XHT-500 being most preferred for the higher temperature applications.

Any wave bearing is suitable for use in the present invention, including circular bearings, non-circular bearings, air bearings, and other types of wave bearings. Conventional roller element bearings are not suitable for use in the present invention. This invention is particularly useful in bearings subject to operating conditions of high temperature and high speeds. Especially suitable for use herein are bearings of materials which can withstand high temperatures, and in particular bearings of the wave design. General descriptions of wave bearings are disclosed in U.S. Pat. No. 6,024,493, U.S. Pat. No. 5,593,230, and by Dimofte, in "Wave Journal Bearing with Compressible Lubricant—Part I: The Wave Bearing Concept and a Comparison to the Plain Circular Bearing," STLE Tribology Transactions, Vol. 38(1), pp. 153-160 (1995), each incorporated herein by reference.

The bearing can be lubricated using a supply system, which is a system for introducing a lubricating oil to the gap between the bearing internal surface and the shaft. Typically a pump is employed to feed the oil through a tube or other conveyance or conduit means into the gap. The oil can be collected and recirculated. Preferably the supply system is a pocket supply system, which means that lubricating oil is introduced at a positive supply pressure. These pockets are ports in the hollow bearing for providing lubricating oil between the shaft and the bearing, i.e., into the gap.

The present invention further comprises a method of a lubricating a wave bearing in a machine comprising (a) providing a wave bearing, (b) providing an oil which lubricates said bearing to produce a lubricated bearing, and (c) operating said machine at a temperature greater than about 121° C. wherein said oil sustains said temperature without decomposition. More specifically the invention comprises use of a lubricated wave bearing structure in a gas turbine, or other high speed, high performance machine operated under conditions whereby the oil reaches temperatures greater than about 121° C. In particular, a high speed, high performance machine is defined herein as a machine that operates with at least one bearing structure wherein the bearing structure is exposed to a temperature of greater than 121° C. and is exposed to various loads, including radial loads, axial loads, and combinations of these. Such high performance machines include gas turbines, such as those found in helicopters, airplanes (including both military and commercial jets), power plants, and military vehicles. High performance machines also include machines and devices used in electronic communication and other electronic devices.

The bearing provided for use in such high performance machines is a wave bearing as described above. Thermally and oxidatively stable oils for use in the high performance machines are those as described above which are stable at temperatures from about 121° C. to about 399° C. In particular, the machine is operated under conditions such that the oil is exposed to a temperature of at least 121° C., more preferably at least 149° C., more preferably at least 204° C., more preferably at least 250° C., more preferably at least 288° C., and temperatures can be up to 399° C. Maximum temperature should be kept lower than the decomposition threshold temperature of the oil to avoid corrosion of some parts of the machine. The oils used in the present invention sustain temperatures up to about 399° C. without decomposition. Loads on the machine are radial, axial or both. Operating speeds of the machine can range up to about 1 million DN, preferably up to about 1.4 million DN, more preferably up to about 3 million DN, and most preferably up to about 4 million DN. DN is the product of the bearing bore diameter in nm and the shaft rotative speed in rpm. The bearing is comprised of any of a number of suitable metals or conventional materials. Bearing materials can be coated with suitable composition to provide corrosion resistance. Such anticorrosive coatings include thin dense chrom, silicon nitride, carbon nitride, tungsten carbide/carbon and other similar compositions to aid in prevention of corrosion. The oil is supplied using a suitable supply system to the gap between the bearing internal surface and the shaft.

EXAMPLES

Example 1

A non-circular wave bearing structure is tested under conditions found in general aviation engine gearboxes. The testing apparatus is described in Dimofte, F.; Proctor, M. P.; Fleming, D. P.; Keith, T. G., Jr. "Wave Fluid Film Bearing Tests for an Aviation Gearbox," Technical Memorandum, NASA TM-2000-209766, January, 2000, herein incorporated by reference. The test rig has a shaft supported by wave bearings at both of its ends with a test wave journal-thrust bearing having a diameter of 45 mm located between them. The shaft is elastically coupled to a turbine drive capable of speeds up to 40,000 rpm. The rig housing is supported at its mid-horizontal plane to eliminate thermal misalignment between the rig shaft and the turbine drive shaft as the rig heats. The test bearing sleeve is mounted in the load ring. Set screws in the load ring are used to deform the bearing sleeve to generate the wave profile on the bearing sleeve inner diameter. The shoulders on the journal and the thrust bearing sleeve provide the faces for the wave thrust bearing. All test bearing parts are manufactured from carburized Carpenter Pyrowear-53 specialty alloy and initially coated with Balzars Balinit WC/C (tungsten-carbide/carbon) coating. The rotating thrust bearing surfaces are re-ground after the rotor is assembled to adjust the thrust bearing clearances, which removes the coating from these surfaces. A pneumatic cylinder is used to apply radial load to the wave bearing through a rod connected to the load ring. Axial load is applied to the thrust wave bearing by an air-bladder between the rig housing and the load ring. Radial and axial loads up to 8900N (2000 lb) and 890 N (200 lb), respectively, are applicable. Oil is supplied through the load ring to the center of the wave journal bearing and drains out the bottom of the rig housing. The oil supply system can deliver oil at pressures up to 6.2 bars (90 psi) and temperatures up to 150° C. Hot oil is also trickled over the outside of the load ring to heat it and keep its temperature constant. Measurements are made on shaft speed, radial load, axial load, bearing inlet oil temperature and pressure, thrust bearing exit oil temperature, oil flow rate, and metal temperature of the nearing sleeve. The test rig is operated such that the bearing is exposed to temperatures of 204, 232, 260, 288 and 316° C. with operation at various speeds from 5000 to 30,000 rpm (revolutions per minute) having loads of from 58 to 801 lbs. Dwell time at each condition is about ten minutes to permit the temperature to reach steady state. The maximum load reached is 3563 N at a rotational speed of 25,000 rpm. The load at 30,000 rpm is 3100N. The bearing runs stably and is thermally stable under all test conditions. The maximum temperature in the bearing assembly is monitored during testing. The oil employed is KRYTOX 143AD available from E. I. du Pont de Nemours and Company. This oil sustains a maximum temperature of 290° C. The shaft of the bearing is found to have no damage. In similar tests run with hydrocarbon mineral oils as lubricants, the oils are found to decompose at lower temperatures.

Example 2

Example 1 is repeated using KRYTOX XHT-500 oil at temperatures up to 349° C. at engine speeds up to 30,000 rpm with loads up to 700 lbs. After 45 minutes the maximum temperature is 349° C. with a load of 3109N and a speed of 29,000 rpm. The oil sustains the temperature of 349° C. The bearing runs stably at all speeds and loads tested. A continuous 8-hour run is conducted with this oil between 348 and 356° C. at speeds up to 29,000 rpm and loads up to 825 lbs. No significant wear is shown by the bearing and there is no oil decomposition.

What is claimed is:

1. A method of lubricating a wave bearing in a machine having radial loads, axial loads, or both, said method comprising (a) introducing oil to said bearing to produce a lubricated bearing, wherein the oil is introduced into a gap between the bearing and a shaft by a pump or by a pocket supply system, and wherein the oil is selected from the group consisting of perfluoropolyethers, derivatized perfluoropolyethers, fluorosilicones, polychlorotrifluoroethers, and polyphenyl ethers, and (b) operating said machine at a temperature greater than 149° C., and at an operating speed of up to 1.4 million DN wherein said oil sustains said temperature without decomposition.

2. The method of claim 1 wherein the oil is a perfluoropolyether.

3. The method of claim 2 wherein said lubricating is carried out at a temperature from about 149° C. to about 399° C.

4. The method of claim 3 wherein said lubricating is carried out at a temperature from about 204° C. to about 399° C.

5. The method of claim 3 wherein said lubricating is carried out at a temperature from about 250° C. to about 399° C.

6. The method of claim 3 wherein said lubricating is carried out at a temperature from about 288° C. to about 399° C.

7. The method of claim 2 wherein the bearing is coated with a composition to provide corrosion resistance.

8. The method of claim 2 wherein said machine has an operating speed of up to 3 million DN.

9. The method of claim 2 wherein said machine has an operating speed of up to 4 million DN.

10. The method of claim 1 wherein the oil is poly (hexafluoropropylene oxide).

11. A method of a lubricating a wave bearing in a machine having radial loads, axial loads, or both, said method comprising (a) providing a wave bearing, (b) providing an oil which lubricates said bearing to produce a lubricated bearing, wherein the oil is introduced into a gap between the bearing and a shaft by a pump or by a pocket supply system, wherein said oil is selected from the group consisting of perfluoropolyethers, derivatized perfluoropolyethers, fluorosilicones, polychlorotrifluoroethers, and polyphenyl ethers, and (c) operating said machine at a temperature in the range of 204 to 316° C., at a speed of 5000 to 30,000 rpm, wherein said oil sustains said temperature without decomposition.

12. The method of claim 11 wherein the oil is a perfluoropolyether.

13. The method of claim 12 wherein the bearing is coated with a composition to provide corrosion resistance.

14. The method of claim 12 wherein the oil is introduced by a pocket supply system.

15. The method of claim 12 wherein said machine has a radial load up to 8900 N and an axial load of up to 890 N.

16. The method of claim 11 wherein the oil is poly (hexafluoropropylene oxide).

* * * * *